(12) United States Patent
Ide et al.

(10) Patent No.: US 6,298,751 B1
(45) Date of Patent: Oct. 9, 2001

(54) DRIVE TRANSMISSION APPARATUS FOR TWIN-SCREW EXTRUDER

(75) Inventors: Akinori Ide, Fujinomiya; Kuniaki Endoh, Susono; Mitsuoki Hatamoto, Mishima, all of (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/965,993

(22) Filed: Nov. 7, 1997

(30) Foreign Application Priority Data

Nov. 7, 1996 (JP) .................................................. 8-311401
Sep. 10, 1997 (JP) .................................................. 9-260811

(51) Int. Cl.⁷ ............................. B29C 47/40; B29C 47/58
(52) U.S. Cl. ..................... 74/665 GA; 74/395; 74/410; 74/421 A; 198/625; 198/663; 366/100
(58) Field of Search .................................. 74/424.7, 395, 74/665 GA, 410, 396, 398, 400, 401; 366/100; 198/625, 663

(56) References Cited

U.S. PATENT DOCUMENTS 4,586,219 * 5/1986 Blach et al. ............................ 74/410
5,213,010 * 5/1993 Hayafusa et al. ................ 74/665 GA
5,511,874   4/1996 Ide et al. .

FOREIGN PATENT DOCUMENTS 62-62038 * 3/1987 (JP) .
62-62039 * 3/1987 (JP) .
2-217650 * 8/1990 (JP) .
6-39900 * 2/1994 (JP) .
7-164508 * 6/1995 (JP) .

* cited by examiner

Primary Examiner—David A. Bucci
Assistant Examiner—William C Joyce
(74) Attorney, Agent, or Firm—Pillsbury WInthrop Intellectual Property Group

(57) ABSTRACT

A drive transmission apparatus for a twin-screw extruder is provided which transmits a rotational driving force from a single prime mover to a first screw and a second screw disposed in parallel to each other, which comprises a transmission shaft, two idler spur gears attached to the transmission shaft, a pair of mutually parallel idler shafts, two idler helical gears, and a helical gear engaging the two idler helical gears. A meshing adjustment device is incorporated into the design that is capable of adjusting the phase of meshing of the gears and tooth bearing in the gear trains of the drive transmission apparatus without the need to disassemble the components, which is a necessary inconvenience of the prior-art apparatus.

4 Claims, 4 Drawing Sheets

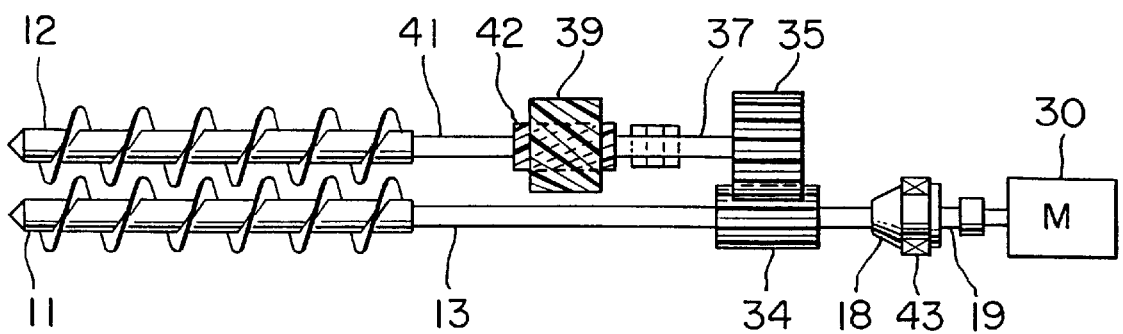
F I G. 1
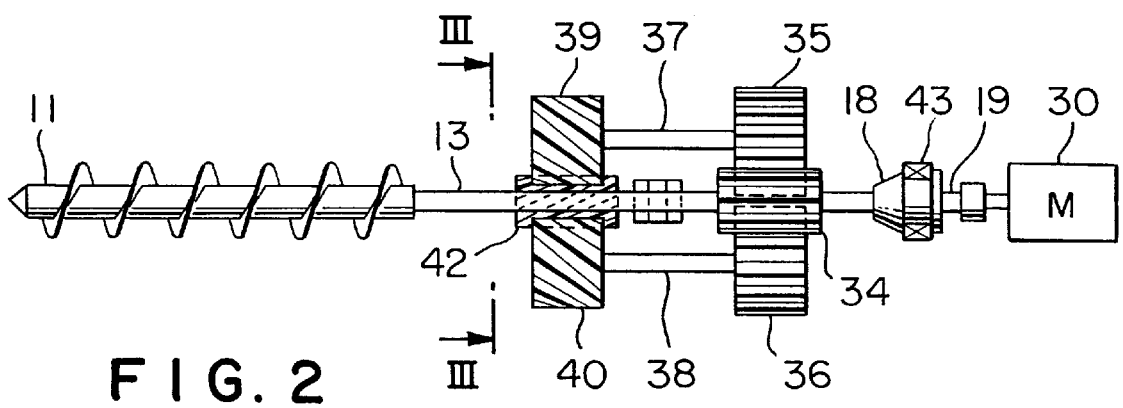
F I G. 2
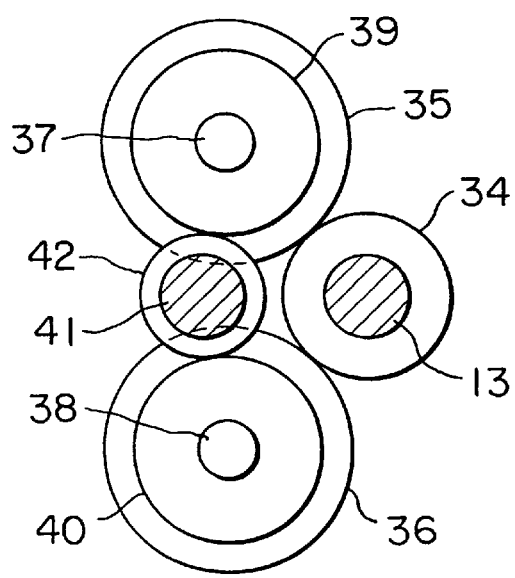
F I G. 3

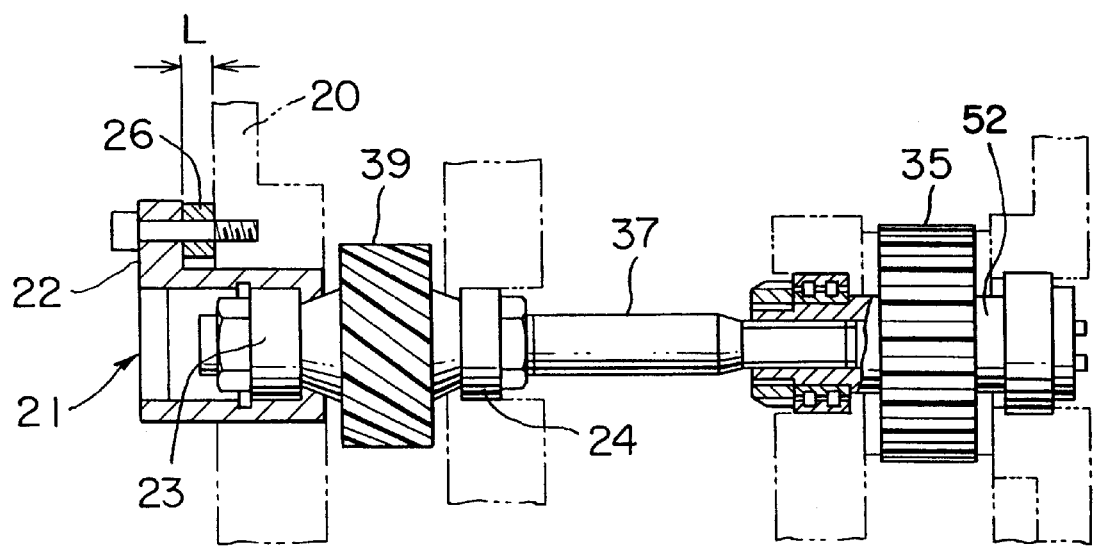
F I G. 4
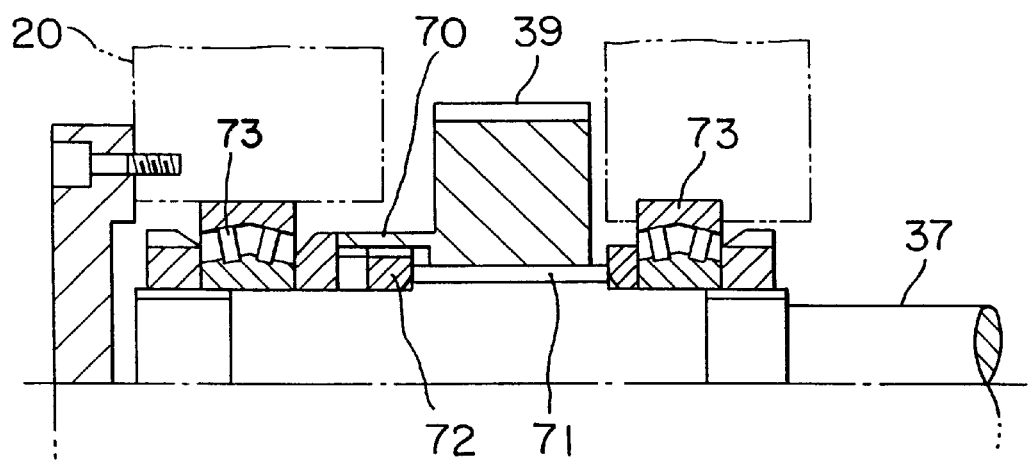
F I G. 5

US 6,298,751 B1

DRIVE TRANSMISSION APPARATUS FOR TWIN-SCREW EXTRUDER

BACKGROUND OF THE INVENTION

Field of the Invention

The present invention relates to a drive transmission apparatus for a twin-screw extruder. In particular, it relates to an improvement that facilitates the adjustment of the gear power-transmission apparatus that transfers rotational power from a prime mover device to screws.

A twin-screw extruder is provided with two screws that are disposed parallel in close proximity. A drive transmission apparatus transfers a rotational driving force from a prime mover to the screws of the twin-screw extruder to cause the screws to rotate. The narrow spacing between the screws sets a limit on a diameter of a gear that is linked to the screws for transferring the rotation thereto. It is not possible to increase the diameter of the gear attached to at least one of the screws.

Since a drive transmission apparatus used in a twin-screw extruder transmits a high level of torque generated by a high-power input but a low rotational speed, the prior-art drive transmission apparatus makes use of gear trains such as those shown in FIGS. 6 to 10.

An example of such a prior-art drive transmission apparatus is shown in FIG. 6. A first screw 11 and a second screw 12 provided for the twin-screw extruder are disposed in parallel. A prime mover such as a motor 30 (which also includes reduction gears) is connected to an input shaft 31. A coupling portion 32 is provided on the end of this input shaft 31. A rear-end portion of a transmission shaft 33 is linked to a first linkage portion 32a of the coupling portion 32 so that the transmission shaft 33 is connected to the input shaft 31 via the coupling portion 32. A front-end portion of the transmission shaft 33 is connected to the first screw 11. A transmission shaft 41 is connected to the second screw 12. To sustain a thrust load from each of the first screw 11 and the second screw 12, thrust bearings 43 and 44 are provided on the ends of the transmission shafts 33 and 41, respectively.

A spur gear 34 is attached to the transmission shaft 33 on the side thereof opposite to the side that is linked to the first screw 11, with the configuration being such that the spur gear 34 is rotated in synchronization and together with the transmission shaft 33. An end portion of the spur gear 34 facing toward the motor 30 engages with a second linkage portion 32b formed in the coupling portion 32.

A side view of the drive transmission apparatus of FIG. 6 is shown in FIG. 7 and a section taken along the line VII—VII of FIG. 7 is shown in FIG. 8. As shown in FIG. 7, two idler spur gears 35 and 36 are provided at one end each of parallel idler shafts 37 and 38, respectively, in engagement with the spur gear 34. Two idler helical gears 39 and 40 are attached to the other ends of the idler shafts 37 and 38, respectively. Each of these idler helical gears 39 and 40 engage with a helical gear 42 that is attached to the transmission shaft 41 of the second screw 12. Therefore, the configuration is such that the rotation of the spur gear 34, which is connected to the input shaft 31 by the coupling portion 32, is transmitted to the transmission shaft 41 of the second screw 12 through the two parallel gear trains (in other words, the gear train consisting of the idler spur gear 35, the idler shaft 37, the idler helical gear 39, and the helical gear 42 and the gear train consisting of the idler spur gear 36, the idler shaft 38, the idler helical gear 40, and the helical gear 42), in such a manner that the second screw 12 rotates.

The teeth of the spur gear 34 and the idler spur gears 35 and 36 extend parallel to the transmission shaft 33 and the idler shafts 37 and 38. The helical gear 42 is configured in such a manner that it has teeth that are inclined in the same direction as those of the second screw 12. This is to ensure that part of the thrust loading that occurs when the second screw 12 is rotationally driven is borne by the idler helical gears 39 and 40 via the helical gear 42.

The first screw 11 and second screw 12 must be made to rotate in the same direction, at the same rotational speed. This is determined by factors such as the number of teeth of each of the gears that form the gear trains, the module of each gears, and intershaft distance.

It is necessary to adjust a phase of meshing of the gears and the tooth bearing thereof, to ensure that the two parallel gear trains (consisting of the idler spur gears 35 and 36, the idler helical gears 39 and 40, and the idler shafts 37 and 38) engage uniformly with the spur gear 34 and the helical gear 42, so that the rotational driving force is transferred uniformly to the first screw 11 and the second screw 12.

In this prior-art drive transmission apparatus, the four gears consisting of the idler spur gears 35 and 36 and the idler helical gears 39 and 40 engage together to form a gear transfer mechanism. Therefore, to adjust the meshing phase or tooth bearing of the gears, at least one of the four gears is adjusted as described below.

The configuration is such that one of the gears, such as the idler spur gear 35, can be released so that it no longer engages with the spur gear 34. The freeing of this idler spur gear 35 makes it possible to make the phase adjustment, etc. The idler spur gear 35 is constructed of two components, a ring-shaped gear portion 35a and a boss portion 57, as shown in FIG. 9. The ring-shaped gear portion 35a has a hole 50. A hub 51 of the boss portion 57 is designed to fit tightly into the hole 50. An annular oil groove 52 is provided in an inner peripheral surface of the ring-shaped gear portion 35a, extending in the circumferential direction thereof. This annular oil groove 52 is designed to form a sealed annular passageway together with the outer peripheral surface of the hub 51.

An oil passageway 53 that communicates with the annular oil groove 52 is formed in either the ring-shaped gear portion 35a or the boss portion 57. High-pressurized oil from a hydraulic power source (not shown in the figures) is supplied from this oil passageway 53 to enable the introduction of high-pressure oil into the annular oil groove 52. This high-pressure oil causes the inner circumference of the ring-shaped gear portion 35a to expand. As a result, a meshing phase adjustment becomes possible because the ring-shaped gear portion 35a can be made to rotate alone about the hub 51 of the boss portion 57. When the phase adjustment is completed, reamer bolts or knock pins 54 can be used to fix the ring-shaped gear portion 35a firmly with respect to the boss portion 57.

Another method that can be used for a meshing phase adjustment is shown in FIG. 10. A thin cylindrical portion 35c is formed integrally with the ring-shaped gear portion 35a in such a manner that it protrudes from the right-hand side thereof as seen in the figures. The boss portion 57 fits into a hole 35b of this thin cylindrical portion 35c in a manner as a clearance fit. An annular oil groove 52 is formed on an inner surface of the ring-shaped gear portion 35a, extending in the circumferential direction thereof. A gap is formed between the ring-shaped gear portion 35a and the boss portion 57 by forcing high-pressurized oil from an oil passageway 53 into the annular oil groove 52. Since this permits the ring-shaped gear portion 35a to rotate alone, it enables phase adjustment and the adjustment of tooth bearing. After the adjustment is completed, a tightening means, which consists of members such as two tightening rings 62 and 63 that fit over the thin cylindrical portion 35c with a tapered ring 60 therebetween, is tightened by using bolts 61. This tightening means ensures that the thin cylindrical portion 35c is firmly connected to the boss portion 57 by frictional force.

With the prior-art apparatus shown in FIG. 9, after the meshing phase and tooth bearing adjustment operation of the gears in the gear transfer mechanisms, in which the four linked gears (the idler spur gears 35 and 36 and the idler helical gears 39 and 40) are engaged, the aforementioned gears must be fixed in place using knock pins and bolts. This required work to fix the gears is an extremely complicated task. In other words, after the gears configuring the gear trains have been engaged and the drive transmission apparatus has been assembled for the first time, the idler gear 35, the boss 57 and reamer bolts or knock pin 54 must be removed from the gear trains to be made free. This freed gear is then disassembled and the phase, etc., thereof is adjusted. Subsequently, the idler gear 35 and the boss 57 must be fixed by using reamer bolts or knock pins. During this process, machining of the reamer bolts or knock pins is also necessary. The apparatus is then reassembled. In this manner, adjustment of the phase of meshing of the gears in the prior-art drive transmission apparatus not only necessitates time and labor, it also means that a large number of components are used in the configuration of the apparatus.

In addition, a twin-screw extruder for plastics is used at a torque that is close to the working limit of the transmission shaft. Since the connection between the gear portion 35a and the boss portion 57 in the prior-art apparatus of FIG. 10 is by friction, as described above, this means that reliability concerns make it difficult to use the apparatus over extended periods, unless there is considerable leeway in the torque.

SUMMARY OF THE INVENTION

An objective of the present invention is to solve the above described defects with the prior art and provide a drive transmission apparatus for a twin-screw extruder which makes it possible to facilitate the adjustment of phase of meshing of the gears, etc., without requiring disassembly of components such as gears once they have been assembled.

Another objective of the present invention is to provide a drive transmission apparatus for a twin-screw extruder which is designed to reduce the number of components configuring the gear trains and also improve reliability.

In order to achieve the above objectives, the drive transmission apparatus for a twin-screw extruder, such that said drive transmission apparatus transmits a rotational driving force from a single prime mover to a first screw and a second screw disposed in parallel, wherein said drive transmission apparatus comprises: a transmission shaft to which is applied a rotation from said prime mover, where one end of said transmission shaft is connected to the first screw and another end thereof opposite to the power source side is attached to a thrust bearing for bearing thrust loads from said first screw; two idler spur gears forming a pair and being engaged with a spur gear attached to an intermediate portion of said transmission shaft; a pair of mutually parallel idler shafts, each being connected at one end thereof to one of said two idler spur gears; two idler helical gears, each attached to the other end of one of said idler shafts; a helical gear attached to said second screw and being threaded in the same direction as the direction of threading of said second screw, engaging with said two idler helical gears in substantially symmetrical positions; and a meshing adjustment means for enabling at least one of the pair of the idler shafts and one of the idler helical gears to move axially.

In this aspect of the present invention, the transmission shaft connected to the first screw transfers the rotation of a motor and is connected to an input shaft, and it is also possible to adjust the phase of meshing of the gears, etc., by moving only one idler helical gear in the axial direction, without any disassembly of the components such as gears in the gear transfer mechanism in which the two idler spur gears and the two idler helical gears are engaged together.

The meshing adjustment device of this drive transmission apparatus for a twin-screw extruder is characterized in that a bearing on the screw side of the idler helical gears is inserted into a bearing case, the bearing case and a bearing at the other end thereof are fitted into a gearbox so as to be free to move in the axial direction, and also a liner for providing phase, etc., adjustment is provided between the bearing case and the gearbox.

The drive transmission apparatus for a twin-screw extruder is further characterized in that it is provided with a meshing adjustment means wherein: a circular cylindrical body provided with a screw-thread on an inner peripheral surface thereof is attached integrally to the idler helical gears; the idler helical gear can be moved in the axial direction by a gear movement means that uses keys or splines, but rotation in the circumferential direction is not possible; and a ring-shaped nut is provided which engages with the screw-thread of the circular cylindrical body, and which rotates at a predetermined location on a idler shaft attached to the idler helical gear to cause the idler helical gear to move in the axial direction.

The drive transmission apparatus for a twin-screw extruder is still further characterized in that, if the meshing phase adjustment achieved by rotation of the ring shaped nut is insufficient, the splines are replaced by helical splines to increase the phase adjustment angle between the shaft and the gear by increasing the rotation achieved by the axial movement of the gear.

BRIEF DESCRIPTION OF THE DRAWINGS

FIG. 1 is a schematic plan view of a first embodiment of present invention;

FIG. 2 is a plan view of the embodiment of FIG. 1;

FIG. 3 is a section taken along the line B—B of FIG. 2;

FIG. 4 is a view illustrative of a shaft-moving device of this first embodiment of the present invention;

FIG. 5 is a view illustrative of another embodiment of the shaft-moving device of this invention;

DESCRIPTION OF PREFERRED EMBODIMENTS

Figure 6:
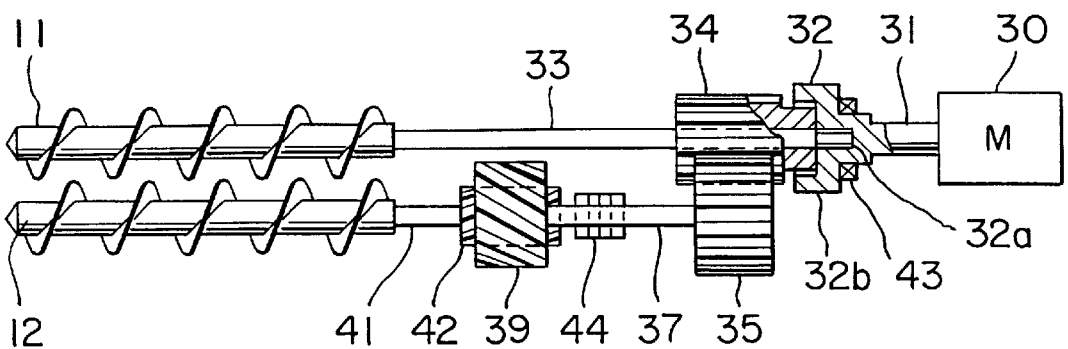
FIG. 6 is a schematic plan view of a prior-art device.
Figure 7:
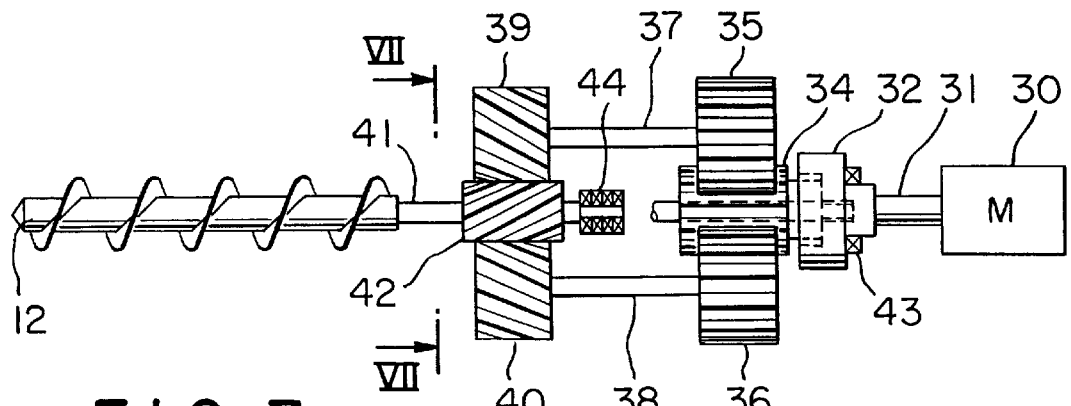
FIG. 7 is a plan view of the device of FIG. 6.
Figure 8:
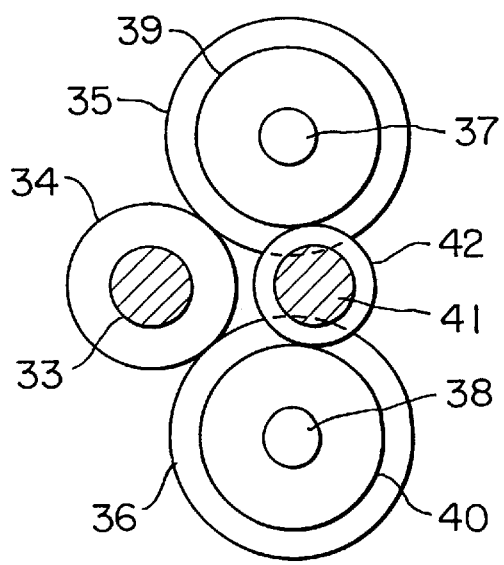
FIG. 8 is a section taken along the line VII—VII of FIG. 7.
Figure 9:
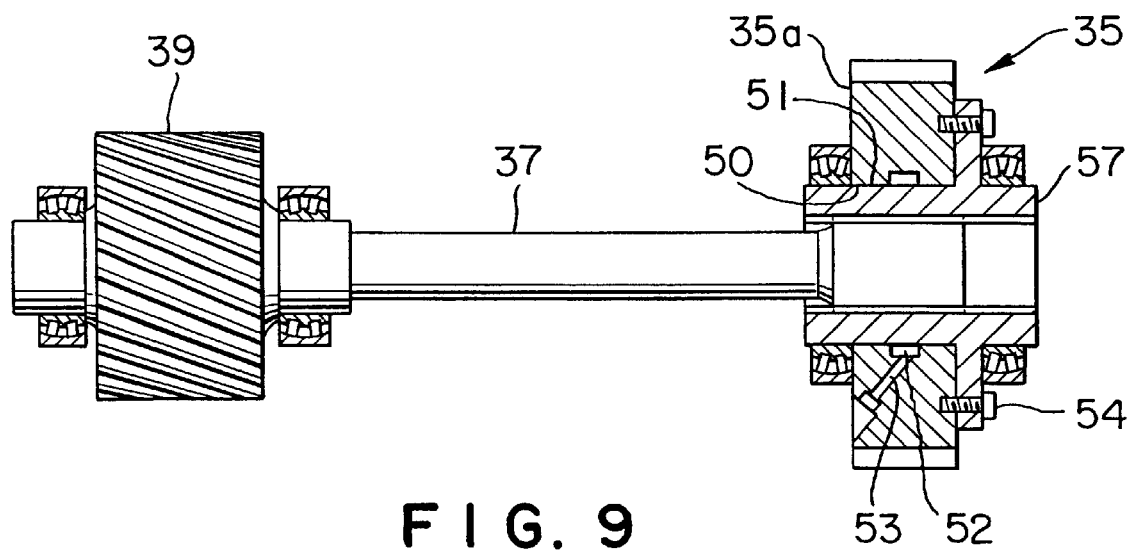
FIG. 9 is a partial enlarged view, illustrating the idler shaft and idler gear that adjust the engagement.
Figure 10:
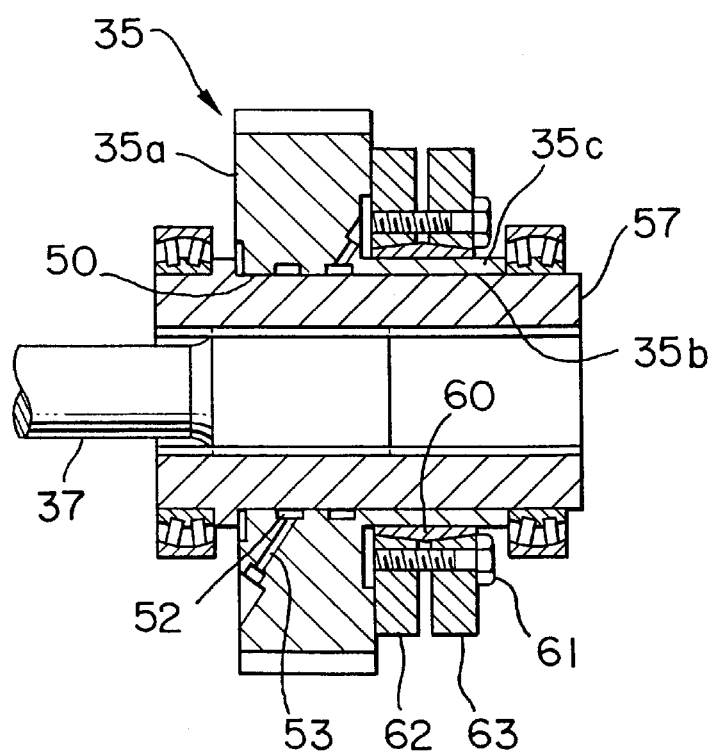
FIG. 10 is a partial enlarged view, illustrating another example of the idler shaft and idler gear that adjust the engagement.

A first embodiment of the present invention is shown in FIGS. 1 to 5. Structural components in these figures that are the same as those of the prior-art drive transmission apparatus shown in FIGS. 6 to 10 are denoted by the same reference numbers and further detailed description thereof is omitted.

A first screw 11 is connected to a transmission shaft 13 that transmits the rotational driving force from a motor 30. A large-diameter portion 18 is formed in the transmission shaft 13 on the motor side thereof. An input shaft 19 is fixed to the large-diameter portion 18 by means of bolts or the like (not shown in the figures). A thrust bearing 43 is also attached to the large-diameter portion 18 to bear any large thrust loads that are applied to the first screw 11. The motor 30, which is the prime mover, is connected to an input shaft 19.

As shown in FIG. 1, a second screw 12 is disposed parallel to the first screw 11. This second screw 12 is threaded in the same direction as the direction of threading of the first screw 11. The second screw 12 is connected to a transmission shaft 41 and a helical gear 42 is attached to the transmission shaft 41. This helical gear 42 is configured in such a manner that it engages with a pair of idler helical gears 39 and 40 in substantially symmetrical positions.

The idler helical gears 39 and 40 are each attached to one end portion of mutually parallel idler shafts 37 and 38, respectively. Idler spur gears 35 and 36 are attached to the other end spline shaft portions of the idler shafts 37 and 38, respectively. At the same time, the idler spur gears 35 and 36 also engage with a spur gear 34 that is attached to the transmission shaft 13 of the first screw 11. Thus the rotational power of the motor 30 is transmitted to the second screw 12 by transmission along two parallel gear trains, one from the spur gear 34, to the idler spur gear 35, to the idler helical gear 39, and then to a helical gear 42, and the other from the spur gear 34, to the idler spur gear 36, to the idler helical gear 40, and then to the helical gear 42.

Referring to FIG. 4, the meshing adjustment device 21 will now be discussed in detail, using the idler helical gear 39 by way of example. FIG. 4 is a detailed view of the portion of FIG. 2 that contains the idler helical gear 39, idler shaft 37, and idler spur gear 35. Integrally attached to the idler helical gear 39, idler shaft 37, and the idler spur gear 35, but not shown in FIG. 2 for clarity, are, a bearing case 22, a gearbox 20 (indicated by broken lines), radial thrust bearings 23 and 24, and liner 26 of thickness L. This integral assembly is designated as the meshing adjustment device 21. Note that another meshing adjustment device 21 of a similar configuration could be provided for the idler helical gear 40 that is paired with the idler helical gear 39, although this is not specifically shown in the figures.

The bearing case 22 is configured to fit into the gearbox 20 for the idler helical gear 39, in such a manner that it is free to slide in the axial direction of the idler shaft 37. A bearing 23 (a radial thrust bearing) is fixed to an inner peripheral surface of the bearing case 22. Another bearing 24 (a radial thrust bearing) is fixed to an inner peripheral surface of the gearbox 20 so as to be free to slide in the axial direction. These bearings 23 and 24 are configured to support the idler shaft 37 in such a manner that it is free to rotate. Additionally, the right end of the idler shaft 37 has a spline 50 or key which is fitted slidably to a shaft 52 provided with keyways in its interior surface. And the bearing case 22 is fitted slidably in the gearbox 20. A liner 26, which is capable of providing adjustment of a thickness L, is inserted into a space between the bearing 23 and the gearbox 20. These features enable the idler shaft 37 and idler gear 39 to move slightly in the axial direction by adjusting the thickness L of the liner 26, i.e., by replacing the liner 24 with that of appropriate thickness. It is to be noted that the bolt 25 which tightens the bearing case 22 to the gear box 20 is loosened while adjusting the liner thickness L. Therefor, when it comes to adjusting the phases of meshing of the gears, the configuration is such that the bearing case 22 to which the bearing 23 is attached, the bearing 24, the idler shaft 37, and the idler helical gear 39 can move in the axial direction as a single unit. This meshing adjustment device 21 is, therefore, capable of adjusting the phase of meshing of the gears and tooth bearing in the gear trains of the drive transmission apparatus, without the necessary inconveniences of the prior-art apparatus, which included complete disassembly of the gear components, machining of reamer bolts or knock pins, and reassembly.

The above description concerned an example of the adjustment by moving the idler shaft 37 on which the gears and bearings remain fixed. The description in FIG. 5 below concerns an example of another embodiment of this invention wherein the idler shaft 37 remains fixed in the axial direction and the idler helical gear 39 alone moves. A female thread is provided on an inner surface of a circular cylindrical body 70 that is integral with the idler helical gear 39. The idler helical gear 39 is attached to the idler shaft 37 in a movable manner by means of strait sided splines,or involute splines, or keys 71 (hereinafter referred to simply as "keys"). An annular nut 72 engages with the female thread formed on an inner peripheral surface of the circular cylindrical body 70. This annular nut 72 is positioned to press against end faces of the keys 71. Therefore, since the configuration is such that the annular nut 72 remains pressed against the end faces of the keys 71 during the adjustment of the phase for meshing of the gears and thus only the idler helical gear 39 moves in the axial direction along the keys 71 and post-adjustment positioning of the idler helical gear 39 can be done.

The idler helical gear 39 is engaged with the helical gear 42 that is attached to the second screw 12 and is threaded in the same direction as the direction of threading of the second screw 12. Therefore, the force relationship during this time is such that thrust loading is applied in the opposite direction (to the right in the figures), and that loading is transferred to the idler shaft 37 by the annular nut 72 via the circular cylindrical body 70, and it is sustained by a thrust bearing 73.

Consider the amount of movement S1 along the pitch cycle of the idler helical gear 39 in this case, assuming that the thread angel of the idler helical gear 39 is $\theta_1$ and the amount of movement in the axial direction is 1, the following equation holds:

$$S_1 = 1 \tan \theta_1 \qquad (1)$$

If the adjustment is found to be insufficient in this case, and the keys 71 that attach the idler helical gear 39 to the idler shaft 37 are replaced with helical splines, the effective radius of these helical splines is $r_1$, the thread angle thereof is $\theta_2$, and the effective radius of the idler helical gear 39 is $r_2$, the amount of movement $S_2$ along the pitch cycle of the gear is given by:

$$S_2 = (r_2/r_1) \cdot 1 \tan \theta_2 \pm S_1$$
$$l = \{(r_2/r_1) \cdot \tan \theta_2 \pm \tan \theta_1\} \qquad (2)$$

where

+: The helical gear and the helical splines are threaded in the same direction

−: The helical gear and the helical splines are threaded in different directions In this case, if the helical gear and the helical splines are threaded in the same direction, the following equation holds, to give a larger amount of adjustment.

$$S_2 = l\{(r_2/r_1)\cdot\tan\theta_2 + \tan\theta_1\}$$

The configuration described above makes it possible to reduce the number of components required for the drive transmission apparatus for a twin-screw extruder in accordance with the present invention, and also makes it possible to perform the entire task of adjusting the meshing phase, tooth bearing of the gears from the exterior of the gearbox, without having to disassemble the components, such as the gears, once they have been assembled.

What is claimed is:

1. A drive transmission apparatus for a twin-screw extruder, the apparatus being capable of transmitting a rotational driving force from a single prime mover to first and second screws disposed parallel to each other, said drive transmission apparatus comprising:

a transmission shaft adapted to be coupled to said prime mover so as to allow a rotational driving force to be applied to said transmission shaft, said transmission shaft at one end being connected to said first screw and the other end being connected to a thrust bearing for bearing thrust loads from said first screw;

two idler spur gears being engaged with a spur gear attached to an intermediate portion of said transmission shaft;

a pair of mutually parallel idler shafts, each of said idler shafts having a first end and a second end, where said first end is connected to one of said two idler spur gears;

two idler helical gears, each attached to the second end of one of said idler shafts;

a helical gear attached to said second screw and being threaded in the same direction as the direction of threading of said second screw, engaging with said two idler helical gears in substantially symmetrical positions; and a meshing adjustment means for enabling at least one of the pair of the idler shafts and at least one of the idler helical gears to move axially, said meshing adjustment means comprises:

a bearing case for housing one of a plurality of radial thrust bearings, where said radial thrust bearings support one of said idler shafts and are disposed on both sides of one of said idler helical gears;

a gearbox for holding both the bearing case and at least one of said radial thrust bearings so that at least one of said radial thrust bearings is free to move in the axial direction; and a replaceable liner for providing adjustment inserted into a clearance between the bearing case and the gearbox, the thickness of said replaceable liner being sufficient to enable the idler shaft and the idler helical gear to move in the axial direction.

2. A drive transmission apparatus for a twin-screw extruder, the apparatus being capable of transmitting a rotational driving force from a single prime mover to first and second screws disposed parallel to each other, said drive transmission apparatus comprising:

a transmission shaft adapted to be coupled to said prime mover so as to allow a rotational driving force to be applied to said transmission shaft, said transmission shaft at one end being connected to said first screw and the other end being connected to a thrust bearing for bearing thrust loads from said first screw;

two idler spur gears being engaged with a spur gear attached to an intermediate portion of said transmission shaft;

a pair of mutually parallel idler shafts, each of said idler shafts having a first end and a second end, where said first end is connected to one of said two idler spur gears;

two idler helical gears, each attached to the second end of one of said idler shafts;

a helical gear attached to said second screw and being threaded in the same direction as the direction of threading of said second screw, engaging with said two idler helical gears in substantially symmetrical positions; and a meshing adjustment means for enabling at least one of the pair of the idler shafts or at least one of the idler helical gears to move axially, said meshing adjustment means comprises:

one of said idler helical gears attached integrally to a circular cylindrical body provided with a screw-thread on an inner peripheral surface of the circular cylindrical body;

a gear movement means for enabling at least one of said pair of idler shafts or at least one of said idler helical gears to move in the axial direction; and a ring-shaped nut which engages with said screw-thread of said circular cylindrical body, and which rotates at a predetermined location on the idler shaft attached to said idler helical gear to enable said idler helical gear to move in the axial direction.

3. The drive transmission apparatus for a twin-screw extruder as defined in claim 2, wherein said gear movement means is a key.

4. The drive transmission apparatus for a twin-screw extruder as defined in claim 2, wherein said gear movement means is a spline.

* * * * *